(12) United States Patent
Koppers

(10) Patent No.: US 10,358,238 B2
(45) Date of Patent: Jul. 23, 2019

(54) METHOD AND DEVICE FOR PRODUCING PACKAGES

(71) Applicant: KHS GmbH, Dortmund (DE)

(72) Inventor: Jörg Koppers, Uedem (DE)

(73) Assignee: KHS GmbH, Dortmund (DE)

( * ) Notice: Subject to any disclaimer, the term of this patent is extended or adjusted under 35 U.S.C. 154(b) by 455 days.

(21) Appl. No.: 15/021,797

(22) PCT Filed: Jul. 24, 2014

(86) PCT No.: PCT/EP2014/065954
§ 371 (c)(1),
(2) Date: Mar. 14, 2016

(87) PCT Pub. No.: WO2015/036157
PCT Pub. Date: Mar. 19, 2015

(65) Prior Publication Data
US 2016/0221697 A1 Aug. 4, 2016

(30) Foreign Application Priority Data
Sep. 12, 2013 (DE) .................... 10 2013 110 012

(51) Int. Cl.
B65B 35/24 (2006.01)
B65G 47/08 (2006.01)
B65G 21/20 (2006.01)
B65B 17/02 (2006.01)
B65B 21/00 (2006.01)
B65B 35/44 (2006.01)
(Continued)

(52) U.S. Cl.
CPC .............. B65B 17/02 (2013.01); B65B 21/00 (2013.01); B65B 27/04 (2013.01); B65B 35/243 (2013.01);
(Continued)

(58) Field of Classification Search
CPC .......... B65B 17/02; B65B 27/04; B65B 51/06; B65B 51/18; B65B 35/54; B65B 21/00;
(Continued)

(56) References Cited

U.S. PATENT DOCUMENTS 3,194,381 A 7/1965 Sherman
3,336,723 A * 8/1967 De Shazor, Jr. ...... B65B 17/025
198/379

(Continued)

FOREIGN PATENT DOCUMENTS

DE 101 63 268 7/2003
DE 102011106759 * 6/2011
(Continued)

Primary Examiner — Michael N Orlando
Assistant Examiner — Christian Roldan
(74) Attorney, Agent, or Firm — Occhiuti & Rohlicek LLP

(57) ABSTRACT

A method for container packaging includes producing a container package that has at least two rows of containers, each row having more than one container. The method forming sub-groups by dispersing a container flow, applying adhesive to the containers, and re-compacting the container flow to adhesively connect the containers together to make the sub-group. This is followed by joining two sub-groups together to make the container group. Within a treatment segment, the containers pass between belt arrangements that move at different speeds for dispersing and re-compacting container flows.

20 Claims, 8 Drawing Sheets

(51) Int. Cl.
- *B65B 35/58* (2006.01)
- *B65B 35/54* (2006.01)
- *B65B 51/06* (2006.01)
- *B65B 51/18* (2006.01)
- *B65B 27/04* (2006.01)

(52) U.S. Cl.
CPC .............. *B65B 35/44* (2013.01); *B65B 35/54* (2013.01); *B65B 35/58* (2013.01); *B65B 51/06* (2013.01); *B65B 51/18* (2013.01); *B65G 21/2054* (2013.01); *B65G 47/088* (2013.01)

(58) Field of Classification Search
CPC ....... B65B 35/44; B65B 35/58; B65B 35/243; B65B 35/405; B65G 47/088; B65G 21/2054
USPC .......................................................... 156/60
See application file for complete search history.

(56) References Cited

U.S. PATENT DOCUMENTS

| | | | |
|---|---|---|---|
| 4,078,357 A | | 3/1978 | Noble |
| 5,086,855 A | * | 2/1992 | Tolson ............... B65G 21/2054 177/145 |
| 5,638,665 A | * | 6/1997 | Muller .................... B65B 21/06 198/419.3 |
| 6,047,526 A | * | 4/2000 | Draghetti ................ B65B 35/44 198/444 |
| 9,493,257 B2 | * | 11/2016 | Stuhlmann ............. B65B 17/02 |

FOREIGN PATENT DOCUMENTS

| | | |
|---|---|---|
| DE | 10 2011 106759 | 9/2012 |
| DE | 10 2012 005 925 | 11/2012 |
| DE | 10 2011 119967 | 1/2013 |
| EP | 0 875 457 | 11/1998 |

\* cited by examiner

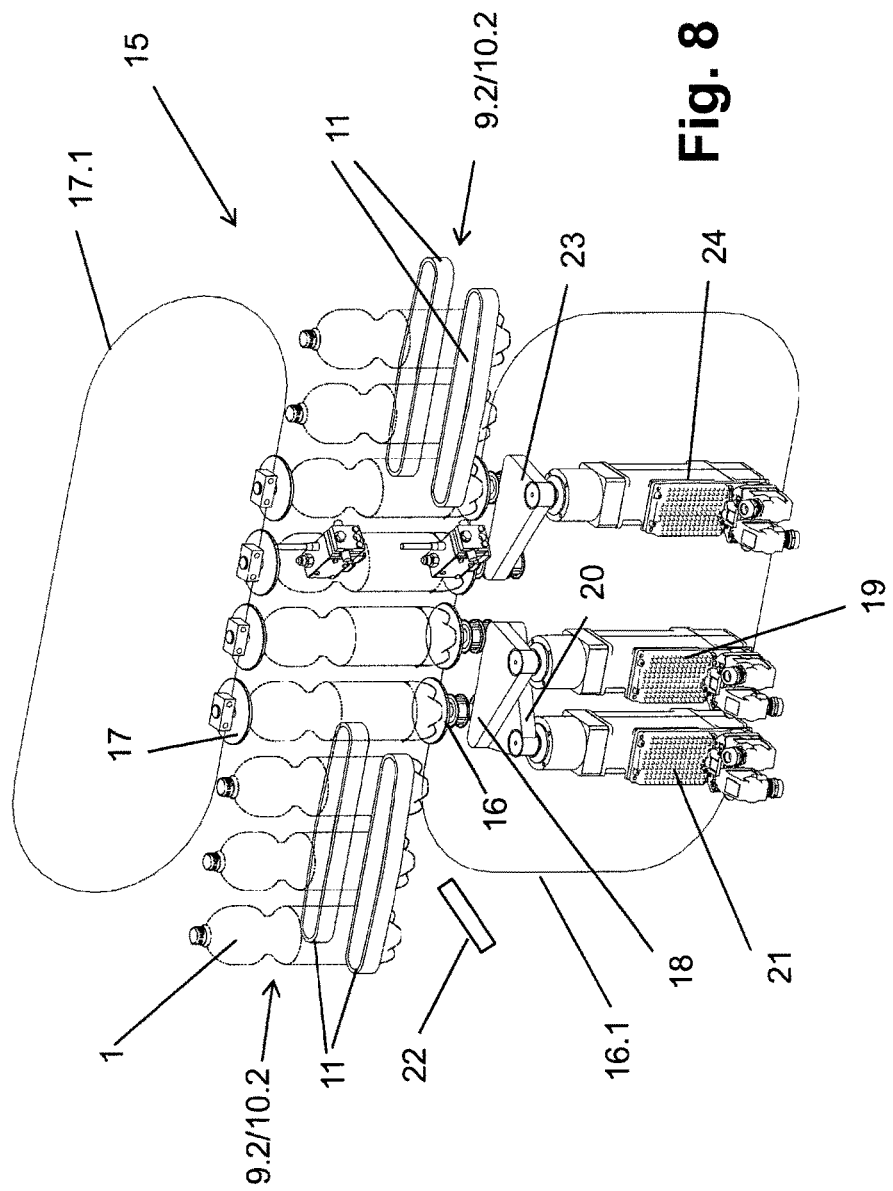

METHOD AND DEVICE FOR PRODUCING PACKAGES

RELATED APPLICATIONS

This is the national stage under 35 USC 371 of PCT/EP2014/065954, filed on Jul. 24, 2014, which claims the benefit of the Sep. 12, 2013 priority date of German application DE 10 2013 110 012.0, the contents of which are incorporated herein by reference.

FIELD OF INVENTION

The invention relates to container packaging, and in particular, to formation of container bundles.

BACKGROUND

Containers are often sold in groups. There are a variety of ways to join containers into groups.

One way to group containers is to use plastic rings. However, this approach generates considerable environmental waste.

Another approach is to shrink wrap the containers. This has the disadvantage of high energy costs associated with shrink wrapping. In addition, the integrity of the package is increasingly destroyed as containers are removed.

A promising approach to packaging is the use of adhesive to join containers together. A difficulty with this approach is that of placing adhesive on containers in the correct orientation so that the containers, when pressed together at the end, actually stick together.

SUMMARY

An object of the invention is to provide a way to form container bundles by adhesively joining containers.

In one aspect, the invention features a method that includes producing a container package that has at least two rows of containers, each row having more than one container. Producing such a package includes receiving a multi-track container flow, forming a first dispersed container flow from a first single-track container flow from the multi-track container flow, applying first adhesive spots to containers in the first dispersed container flow, after having applied the first adhesive spots, forming a first re-compacted container flow from the first dispersed container flow, the first re-compacted flow including first container sub-groups in which containers have been joined together by the first adhesive spots. This is followed by a similar procedure carried out on a second dispersed container flow from a second single-track container flow from the multi-track container flow, the difference being that in this case, first and second adhesive spots are applied to the containers. The result up to this point is two container sub-groups in which containers have been joined together by the first adhesive spots. The second adhesive spots have yet to be used. This use comes in the next step, which is use the second adhesive spots to join the two container sub-groups together to form the container package. In both cases, the process of forming a dispersed container flow includes passing containers in a received single-track container flow between a pair of belt arrangements, each of which is driven in an endless loop, and each of which has a length that extends in a transport direction and that contacts containers in the container flow to propel the containers along the transport direction at a first transport speed, and wherein forming a re-compacted container flow includes receiving a dispersed container flow moving at a first transport speed, passing the dispersed container flow between a pair of belt arrangements, each of which is driven in an endless loop, and each of which has a length that extends in a transport direction and that contacts containers in the container flow to propel the containers along the transport direction at a second transport speed that is less than the first transport speed.

In some practices, applying first and second adhesive spots to containers in the second dispersed container flow includes applying a first adhesive spot to the container, rotating the container about a container axis thereof, and applying a second adhesive spot to the container. In these practices, within a container sub-group, the first adhesive spot is oriented to face a transport direction of the containers and the second adhesive spot faces a direction transverse to the transport direction.

Other practices of the invention include forming a compacted track from each track in the multi-track container flow, thereby causing the first and second single-track container flows to be compacted container flows. In these practices, compacting a container flow includes receiving a container flow moving at a first transport speed, passing the container flow between a pair of belt arrangements, each of which is driven in an endless loop, and each of which has a length that extends in a transport direction and that contacts containers in the container flow to propel the containers along the transport direction at a second transport speed that is less than the first transport speed. This has the effect of packing containers more closely together in much the same way that the distance between cars moving in a lane of a road can be made smaller by placing a slow-moving lead car in a lane.

In other practices, joining the two container sub-groups together includes pressing the first and second container sub-groups against each other in a direction perpendicular to a transport direction along which containers are being moved. In these practices, pressing includes passing the first and second container sub-groups between two opposed belt arrangements, each of which includes belts that are driven in an endless loop along the transport direction, each of the belts contacting the containers while the containers are between the belt arrangements.

In other practices of the invention, each of the belt arrangements includes at least two belts, each of which forms an endless loop that extends along a horizontal plane that is perpendicular to axes of the containers. These endless loops are spaced apart from each other along the direction parallel to the axes of the containers.

Other practices of the invention include forming a dispersed container flow with a first belt arrangement that extends between a first pulley and a second pulley, and forming a re-compacted flow with a second belt arrangement that extends between the second pulley and a third pulley, and that overlaps the first belt arrangement at the second pulley such that containers are continuously in contact with one of the two belt arrangements.

In some practices of the invention, applying first and second adhesive spots includes applying the first adhesive spot at a first circumferential angle, and applying the second adhesive spot at a second circumferential angle that is ninety degrees offset from the first circumferential angle.

In yet other practices, applying a first adhesive spot includes, based on a location of a fitting on the container, rotating the container, and applying the first adhesive spot to the container at a location that depends on an extent of the rotation. Among these are practices that include engaging the container with a plate that is coupled to a servo-motor. In these practices, rotating the container includes using the servo-motor to rotate the plate.

In another aspect, the invention features an apparatus for forming a package that includes at least two rows of containers, each of which has at least two upright containers, each of the containers having a container axis, the apparatus includes first and second treatment segments that receive corresponding first and second single-track container flows at a container inlet from a conveyor. First and second adhesive applicators then apply adhesive spots to corresponding containers in each treatment segment. First and second re-compacting sections then receive dispersed container flows and re-compact them. The first and second treatment segments each include belt arrangements that form closed horizontal loops. Each belt arrangement includes a plurality of belts, each of which has inner loop length that contacts containers and propels the containers along a direction.

In some embodiments, each belt arrangement includes at least a two belts, each of which defines a loop having a loop length at which it engages containers. A separation distance separates the two loop lengths from each other in a direction parallel to the container axes.

In other embodiments, the re-compacting sections each include a pair of belt arrangements, each of which is driven in an endless loop, and each of which has a length that extends in a transport direction and that contacts containers in the container flow to propel the containers along the transport direction at a second transport speed that is less than a first transport speed at which containers enter the re-compacting section. As a result, a container flow leaving the re-compacting section is more compact than a container flow entering the re-compacting section.

In other embodiments, each of the treatment segments includes a compacting section upstream of the re-compacting section. This compacting section includes a pair of belt arrangements, each of which is driven in an endless loop, and each of which has a length that extends in a transport direction and that contacts containers in the container flow to propel the containers along the transport direction at a second transport speed that is less than a first transport speed at which containers enter the compacting section. As a result, container flow leaving the compacting section is more compact than a container flow entering the compacting section.

In yet other embodiments, each of the belt arrangements includes a first belt and a second belt. The first belt forms a first closed loop and the second belt forms a second closed loop that is offset from the first closed loop in a direction parallel to the container axes. The two closed loops are in parallel planes that are perpendicular to the container axes.

Still other embodiments ensure that containers traversing a treatment segment remain in continuous contact with a belt arrangement. This is implemented by having each of the first and second treatment segments include a first belt arrangement and a second belt arrangement downstream from the first belt arrangement. The first belt arrangement ends at a transition point and wherein the second belt arrangement begins at that transition point. At this transition point, the first and second belt arrangements overlap at the transition point.

In some embodiments, at least one of the belt arrangements includes a first belt that engages a container on a first side and a second belt that engages the container on a second side that is opposite the first side, wherein the first and second belts are driven at different speeds, thereby causing a container engaged by the first and second belts to be rotated by an extent that depends on a speed differential between the first and second belts, thereby enabling containers to be simultaneously propelled and rotated for application of adhesive spots to selected locations on the containers.

In yet other embodiments, the first and second treatment segments are linear segments.

In still other embodiments, each of the first and second treatment segments includes an adhesive application station that has a controller and a plurality of plates that circulate in a closed circulation loop. The controller controls motion of the plates. In particular, the controller is configured such that, when a plate engages a container, it causes the plate to bring the container to an adhesive applicator and to rotate the container such that the adhesive applicator is able to place an adhesive spot on a selected location on the container. Among these are embodiments that further include a servo drive and a belt driven by the servo drive. In these further embodiments, the belt is arranged along a portion of the closed circulation loop such that the belt engages a plate, and the controller controls the servo motor to bring the container to an adhesive applicator and to rotate the container such that the adhesive applicator is able to place an adhesive spot on a selected location on the container.

Suitable adhesives for use with the invention include adhesives that are self-adhering and that produces an adhesive bond by pressing. Other suitable adhesives are adhesives with a short bonding time, such as a hot-melt or melt adhesive.

"Compacting" or "pressing" a container flow means that the containers touch. In contrast, "dispersion" of a container flow refers to increasing the distance between adjacent containers from zero to some number greater than zero.

As used herein, "containers" refers to cans, bottles, tubes, and pouches, whether made of metal, glass and/or plastic, as well as other packaging containers suitable for filling with liquid or viscous products, such as filling with powdered, granulated, fluid, or viscous products.

As used herein, "substantially" refers to variations from an exact value of no more than ±10%, preferably of no more than ±5% and/or variations in form of changes that are insignificant for function.

Further embodiments, advantages, and application possibilities of the invention are also derived from the following description of exemplary embodiments and from the figures. In this context, all the features described and/or graphically represented are, individually or in any desired combination, in principle the object of the invention, regardless of their combination in the claims or reference to them. The contents of the claims are also constituent parts of the description.

BRIEF DESCRIPTION OF THE FIGURES

The invention is explained in greater detail hereinafter on the basis of figures relating to exemplary embodiments. These show:

FIGS. 7 and 8 are top and isometric views of an alternative embodiment of a packager.

DETAILED DESCRIPTION

Figure 1:
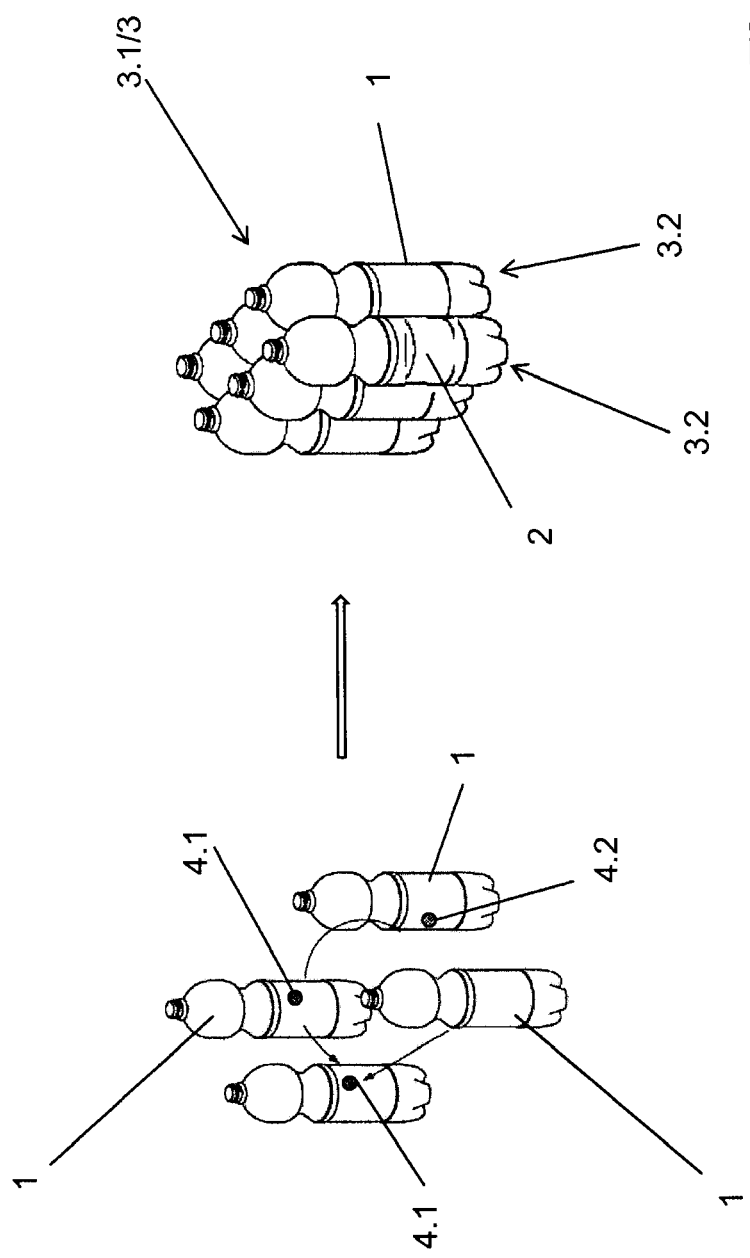
FIG. 1 shows a set of containers and a container package.

FIG. 1 shows containers 1, and in particular, bottles. The illustrated bottles are plastic bottles, and in particular, bottles made of polyethylene terephthalate. These bottles are manufactured by blow molding. The containers 1 are filled with a fluid filling product, closed, and provided with a container fitting, such as a label 2. In the following discussion, it is useful to define a cylindrical coordinate system local to a container 1 so that each point on the container's surface has a circumferential coordinate.

The illustrated containers 1 are organized into container sub-groups 3.2, each of which has three containers 1 arranged in a line. Two container sub-groups 3.2 placed side-by-side form a container group 3.1, which has two rows, one from each sub-group 3.2, and three columns, one for each container 1 in a sub-group 3.2.

First and second adhesive spots 4.1, 4.2 on the walls of the containers 1 enable the containers 1 in a container-group 3.1 to stick together and form a container package 3. The first and second adhesive spots 4.1, 4.2 can be placed at different circumferential angles to facilitate bonding of containers into container packages 3. In a preferred embodiment, a container 1 has first and second adhesive spots 4.1, 4.2 that are ninety degrees apart. The first adhesive spot 4.1 enables a container 1 to adhere to both other containers in its own sub-group 3.2. The second adhesive spot 4.2 enables a container 1 to adhere to a container 1 in another sub group 3.2. Although the figures represent the adhesive spots 4.1, 4.2 by a single point of adhesive, an adhesive spot 4.1, 4.2 need not be a single point. An adhesive spot 4.1, 4.2 can, for example, take the form of a pattern of adhesive regions.

Figure 2:
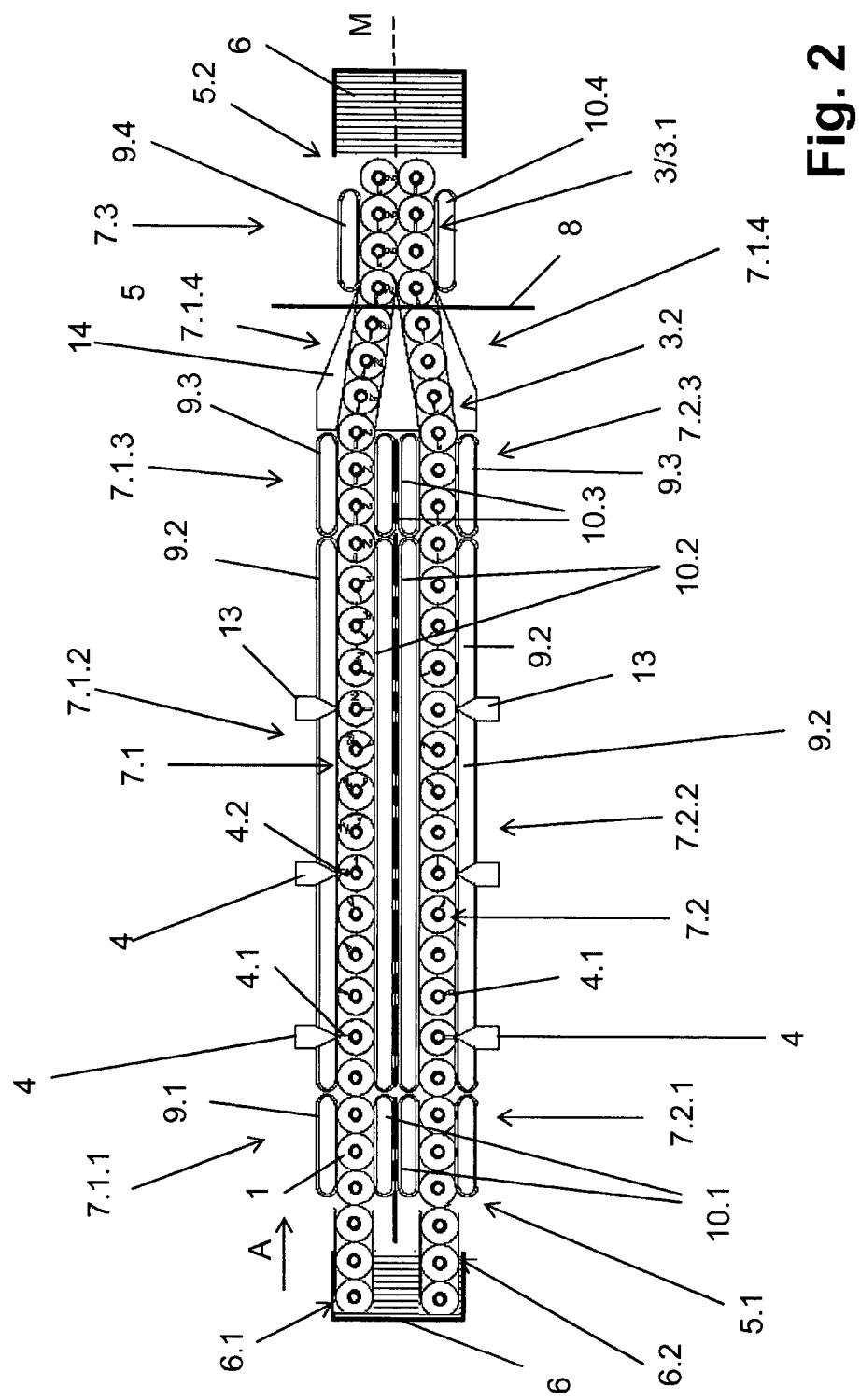
FIG. 2 is a top view of a packager.
Figure 3:
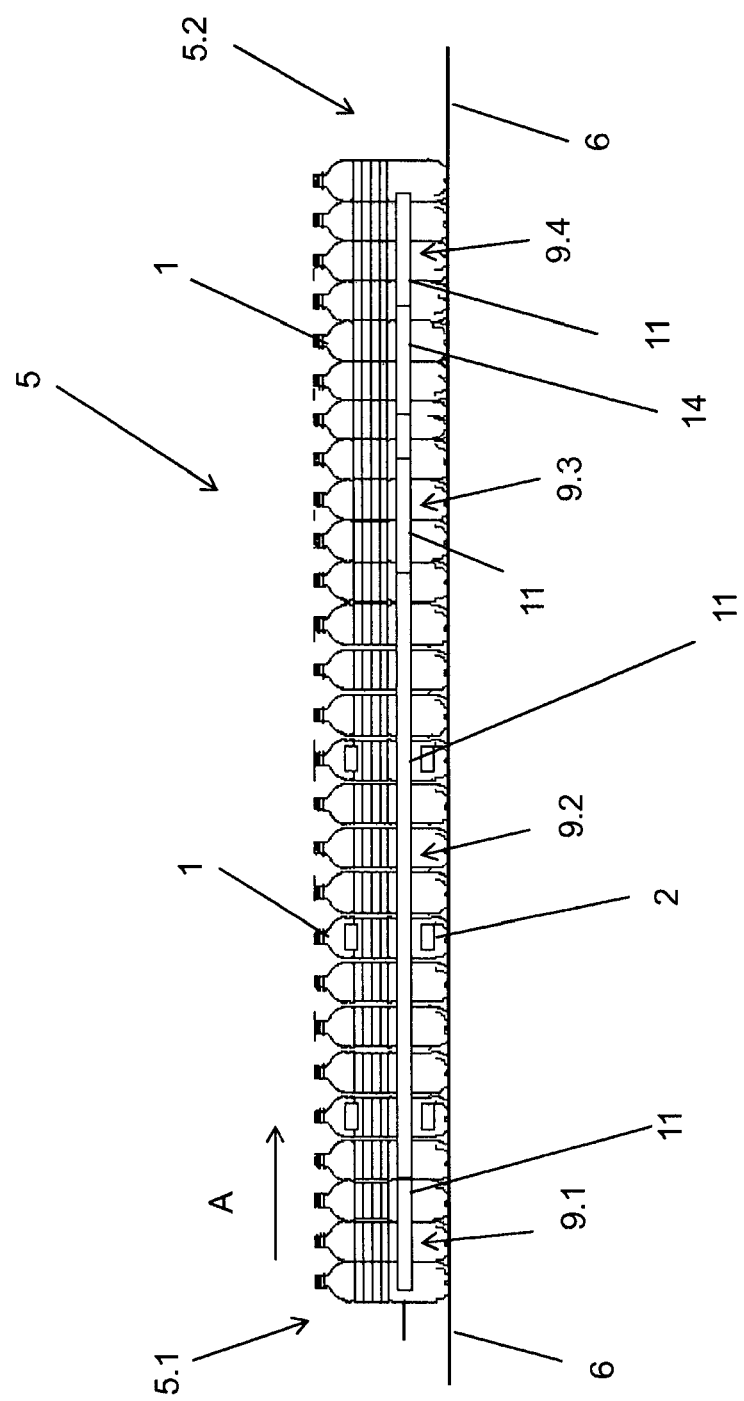
FIG. 3 is a side-view of the packaging shown in FIG. 2.
Figure 4:
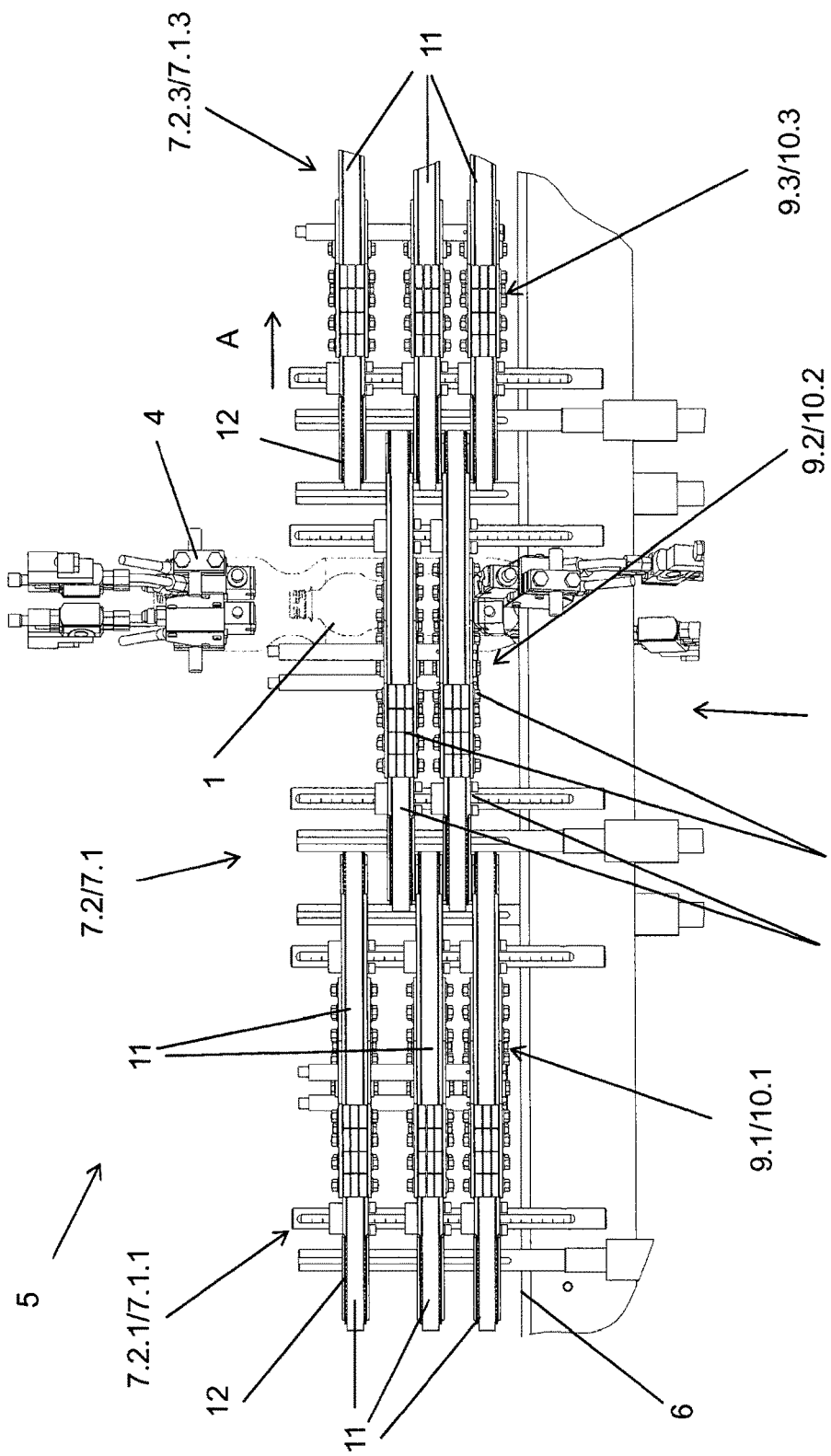
FIG. 4 is a side view showing the details of a belt arrangement used in the packager of FIG. 2.
Figure 5:
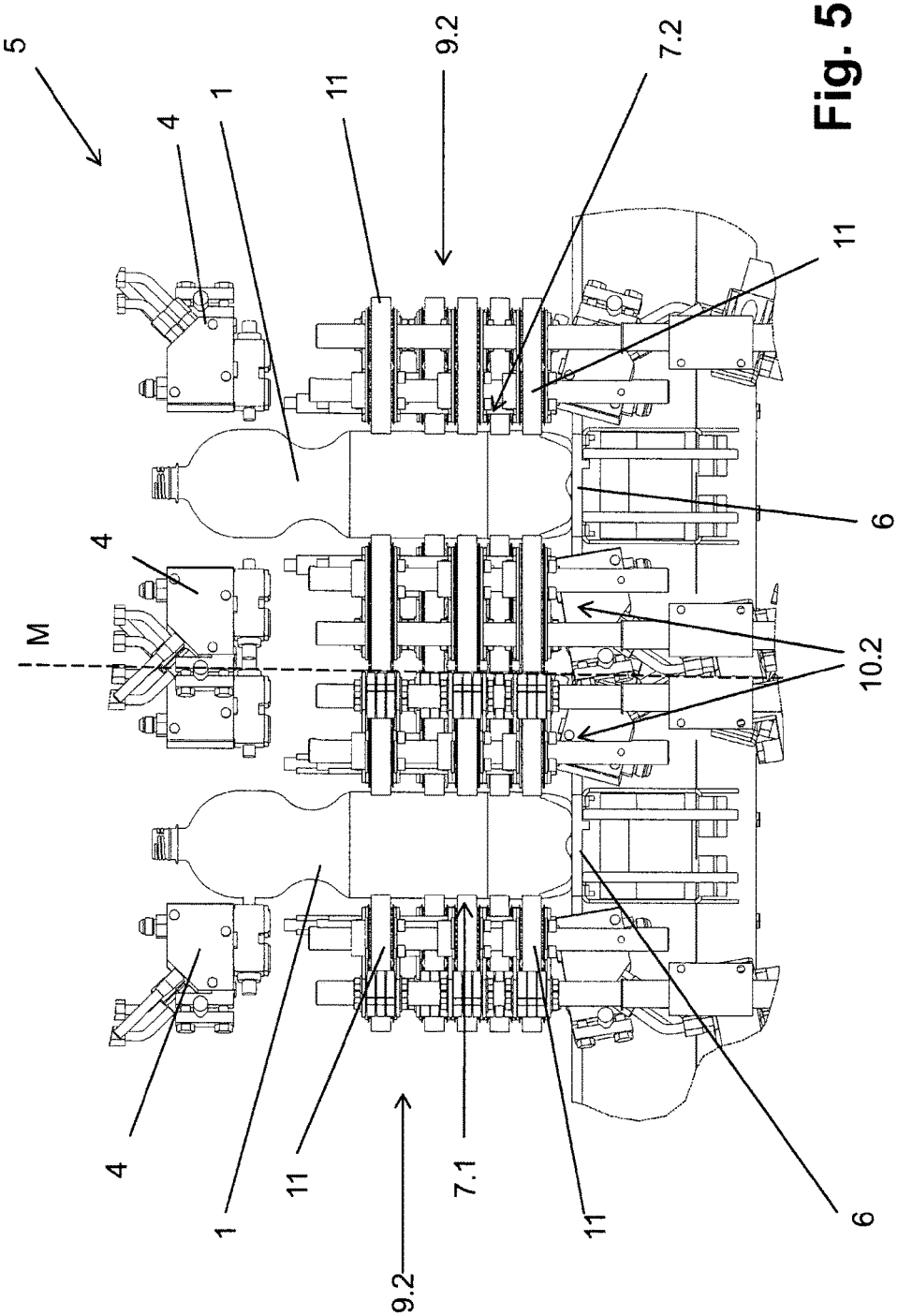
FIG. 5 is a view of the packager from FIG. 2 in the region of the adhesive processing station or in the region of the adhesive spot heads.

Referring now to FIGS. 4 and 5, a packager 5 receives upright containers moving in a transverse direction A at a container inlet 5.1, as shown in FIG. 2. The container inlet 5.1 receives a multi-track container flow having first and second tracks 6.1, 6.2 that travel on a conveyor 6. For convenience, the direction perpendicular to both the transport direction A and the container axes will be referred to as the "transverse direction."

The conveyor 6 forms a horizontal transport plane on which the containers 1 stand upright on their container bases. In one implementation, the conveyor 6 is an endless conveyor loop made of hinged transverse segments that extend in the transverse direction and that connect together at the hinges to form a chain that extends in the transport direction A.

The packager 5 discharges the packages 3 through a container outlet 5.2. In the illustrated embodiment, the conveyor 6 also form a transport element that connects to the container outlet 5.2 for the further transport of the container packages 3.

The packager 5 has first and second treatment segments 7.1, 7.2. The first treatment segment 7.1 extends along a straight line in the transport direction A. The second treatment segment 7.2 is a mirror image of the first treatment about a plane of symmetry M. Accordingly, only the first treatment segment 7.1 merits discussion. The second treatment segment 7.2 works in the same way, with exceptions noted as needed. Containers 1 in the first container track 6.1 pass into and move through the first treatment segment 7.1. Similarly, containers in the second container track 6.2 pass into and move through the second treatment segment 7.2.

To achieve a desired visual appearance of the packages 3, containers 1 are fed into the device 5 is such a way that the labels 2 on the containers 1 have a predetermined orientation inside the container package 3.

To achieve unambiguous and reproducible conditions in the treatment of the containers 1, particularly in the placement of the adhesive spots 4.1, 4.2, the first treatment segment 7.1 includes a compacting section 7.1.1 followed by a dispersion section 7.1.2.

The compacting section 7.1.1 connects directly to the container inlet 5.1. The compacting section 7.1.1 receives containers 1 at the container inlet 5.1 and presses them together so that all the containers follow one another closely in the transport direction A. This results in a compacted container flow downstream of the compacting section 7.1.1.

The dispersion section 7.1.2 receives the compacted container flow from the compacting section 7.1.1. It then introduces a uniform gap into the container flow, thus dispersing containers within the flow in a controlled manner. In addition, the dispersion section rotates the container 1 in a controlled manner about its vertical axis so that an adhesive applicator 4 can apply a first adhesive spot 4.1. The dispersion section 7.1.2 then rotates the container 1 ninety degrees so that another adhesive applicator 4 can apply a second adhesive spot 4.2 to the container 1.

The second treatment segment 7.2 also includes a compacting section 7.2.1 and dispersion section 7.2.2 that operate in the same way. However, in the illustrated embodiment, the dispersion section 7.2.2 of the second treatment segment 7.2 only has to apply the first adhesive spot 4.1.

The placement of adhesive spots 4.1 is controlled in such a way that at least one container 1 allocated to container group 3.2 will not have an adhesive spot facing the transport direction A. For example, in the illustrated embodiment, every third container would not have an adhesive spot facing the transport direction A. This is because if every container 1 had an adhesive spot facing the transport direction A, the resulting container sub-group 3.2 would become infinitely long.

Once the applicator 4 has applied the first and second adhesive spots 4.1, 4.2, the dispersion section 7.1.2 rotates the container 1 about its container axis in such a way that, at the end of the dispersion section 7.1.2, the first adhesive spot 4.1 faces the transport direction A, and the second adhesive spot 4.2 faces the mid-plane M. The containers then move on to a re-compacting section 7.1.3.

The re-compacting section 7.1.3 receives the dispersed container flow and re-compacts it. In particular, the re-compacting section 7.1.3 presses containers 1 against each other in the transport direction A. As the first adhesive spots 4.1 harden, they connect the containers together to form the container sub-groups 3.2.

A similar procedure is carried out at the second treatment segment 7.2, which also has a dispersion section 7.2.2 and a re-compacting section 7.2.3 to form container sub-groups 3.2.

The next step is to combine the two sub-groups 3.2 formed at the first and second treatment segments 7.1, 7.2 into one container package 3. This is carried out by following the re-compacting sections 7.1.3, 7.2.3 with merging sections 7.1.4, 7.2.4 to merge pairs of container sub-groups 3.2 so that they are side-by-side. The side-by-side container groups 3.2 then proceed to a common section 7.3.

At the common section 7.3, pairs of container sub-groups 3.2 are pressed together in the transverse direction to form a container package 3. Once the second adhesive spots 4.2 have hardened, the container package 3 is completed.

An access lock 8 acts as a gatekeeper between the merging sections 7.1.4, 7.2.4 and the common section 7.3. This access lock 8 ensures that the two container sub-groups 3.2 enter the common section 7.3 in a synchronized manner at the same transport speed. In one embodiment, the access lock 8 includes one or more retention elements, such as a sensor-controlled rod that extends in the transverse direction. The rod could be stationary, or it could move together with the container sub-groups 3.2. Preferably, the access lock 8 includes a plurality of retention elements.

First and second belt arrangements 9.1, 10.1 extend in the transport direction A along each side of a compacting section 7.1.1 in such a way that the first belt arrangement 9.1 faces the second belt arrangement 10.1 across the compacting section 7.1.1. A similar pair of first and second belt arrangements 9.1, 10.1 is disposed along the compacting section 7.2.1 of the second treatment segment 7.2.

As seen in FIG. 4, the first and second belt arrangements 9.1, 10.1 each consist of three belts 11, each of which forms a closed horizontal loop. The three loops are offset and spaced apart from each other in the vertical direction. The belts 11 typically have a thickness of at least four millimeters. On the sides at which they contact the containers 1, the belts 11 preferably have a friction coating to ensure good contact with the containers 1. The use of plural belts 11 in the various belt arrangements described herein reduces the likelihood of containers 1 tilting, particularly during handover between the various sections of the treatment segment 7.1, 7.2.

Figure 6:
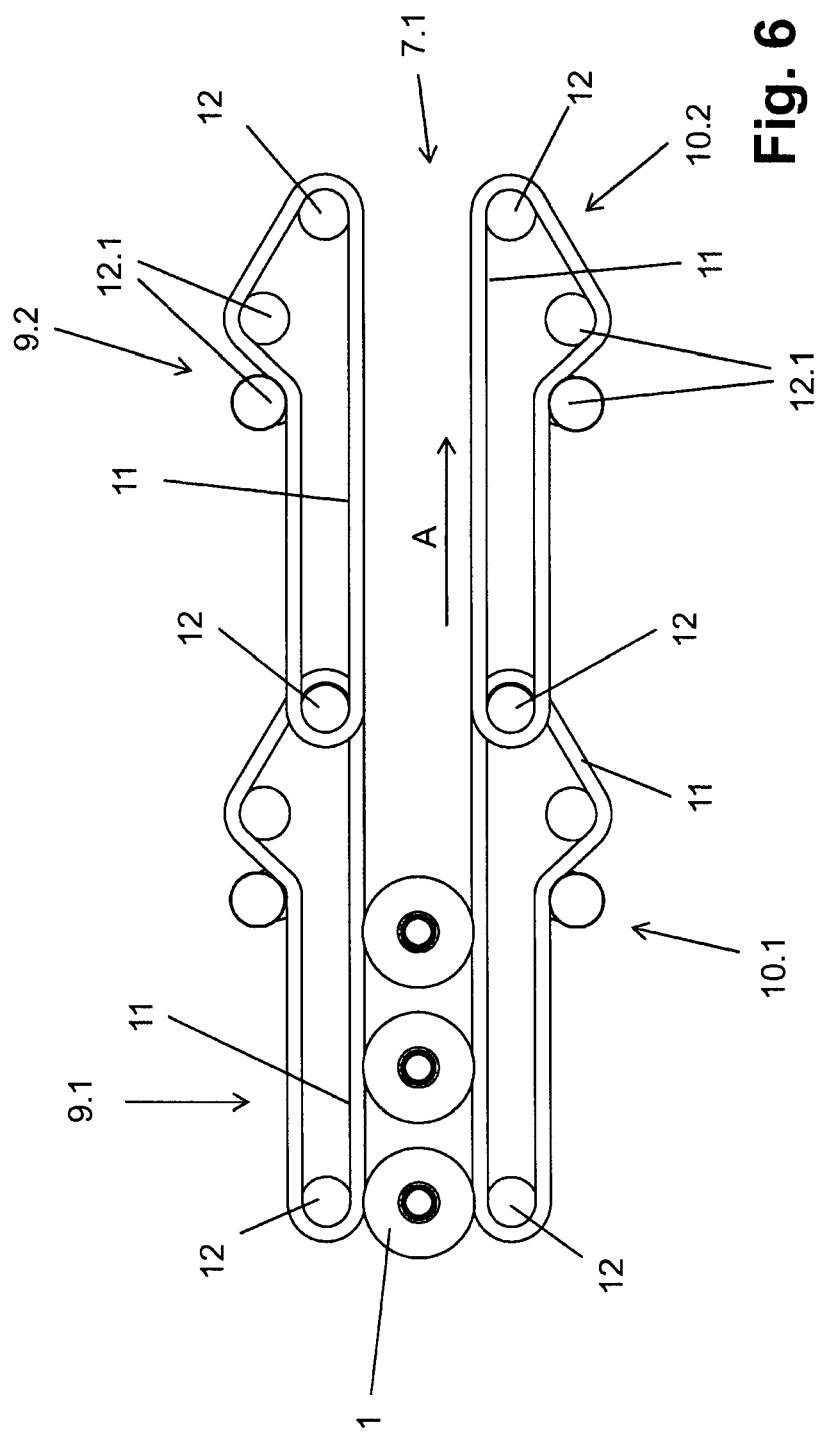
FIG. 6 is a top view of the various belts used in the packager of FIG. 2.

The belts 11 are guided over two belt pulleys 12 and over tensioning pulleys 12.1, the latter being best seen in FIG. 6. The belt pulleys 12 and the tensioning pulleys 12.1 all rotate about a vertical axis. Each loop formed by a belt 11 is arranged such that, at the inner length of its loop extending along the transport direction A, each belt 11 contacts the surface of the containers 1 and presses against those containers in the transverse direction.

To achieve a compacted container flow at the compacting section 7.1.1, the belt pulleys 12 at the end of the compacting section 7.1.1 are driven in such a way that the belt lengths of the first and second belt arrangements 9.1, 10.1 that contact against the containers 1 move in the transport direction A at a transport speed that is lower than that of the conveyor 6. This causes containers 1 to run into each other at the inlet of compacting section 7.1.1, thus forming a compacted container flow. A similar procedure is carried out in the compacting section 7.2.1 of the second treatment segment 7.2.

Beside the dispersion section 7.1.2 are third and fourth lateral belt arrangements 9.2, 10.2 that are configured in a manner that is analogous to the configuration of the first and second belt arrangements 9.1, 10.1. However, the third and fourth belt arrangements 9.2, 10.2 only have two belts 11 apiece that form two horizontal loops.

The belts 11 of the third and fourth belt arrangements 9.2, 10.2 face each other across the dispersion section 7.1.2 and are driven in opposite directions in such a way that loop lengths in contact with the containers 1 move in the transport direction A but at a higher speed than the belts of the first and second belt arrangements 9.1, 10.1, for example, at a speed corresponding to the transport speed of the conveyor 6. The speed of the belts 11 of the of the third belt arrangement 9.2 differs from that of the belts 11 of the fourth belt arrangement 10.2. As a result, the third and fourth belt arrangements 9.2, 10. forming a gap between containers 1 and also rotate a container 1 about its container axes.

An optoelectronic sensor 13 provides a feedback signal to a controller to permit control over the relative speeds of the belts in the third and fourth belt arrangements 9.2, 10.2 in such a way that, by the time a container reaches the re-compacting section 7.1.3, the container's first and second adhesive spots 4.1, 4.2 will face the correct directions.

In addition to ensuring that the proper face is presented for application of an adhesive spot, rotation in the dispersion section 7.1.2 will tend to restore the vertical orientation of an axis of a container that has been perturbed from the vertical position.

Fifth and sixth belt arrangements 9.3, 10.3 extend in the transport direction A along each side of the re-compacting section 7.1.3 in such a way that the fifth belt arrangement 9.3 faces the sixth belt arrangement 10.3 across the re-compacting section 7.1.3. A similar pair of fifth and sixth belt arrangements 9.3, 10.3 is disposed along the re-compacting section 7.2.3 of the second treatment segment 7.2.

As seen in FIG. 4, each of the fifth and sixth belt arrangements 9.3, 10.3 consists of three belts 11, each of which forms a closed horizontal loop. The three loops are offset and spaced apart from each other in the vertical direction.

The belts 11 are guided over two belt pulleys 12 and over tensioning pulleys 12.1, the latter being best seen in FIG. 6. The two belt pulleys 12 and over tensioning pulleys 12.1 all rotate about a vertical axis. Each loop formed by a belt 11 is arranged such that, at the inner length of its loop extending along the transport direction A, each belt 11 contacts the surface of the containers 1 and presses against those containers 1 in the transverse direction.

To restore the compacted container flow that was spaced apart by the dispersion section 7.1.2, the belt pulleys 12 at the end of the re-compacting section 7.1.3 are driven in such a way that the belt lengths of the first and second belt arrangements 9.1, 10.1 that contact the containers 1 move in the transport direction A but at a transport speed that is lower than that of the conveyor 6. This causes containers 1 to run into each other again at the inlet of re-compacting section 7.1.3, thus restoring the compacted container flow. A similar procedure is carried out in the re-compacting section 7.2.3 of the second treatment segment 7.2. The main difference is that the containers now have adhesive spots 4.1 that are being pressed against each other. These adhesive spots 4.1 harden while the containers are on the re-compacting section 7.1.3.

At the merging sections 7.1.4, 7.2.4, converging guides 14 guide the upright containers together.

Seventh and eighth belt arrangements 9.4, 10.4 face each other across the common section 7.3 and are configured in a manner analogous to the first and second belt arrangements 9.1, 10.1. Each of the seventh and eighth belt arrangements 9.4, 10.4 comprise a plurality of belts 11, each forming a closed horizontal loop. These horizontal loops are offset and spaced apart from each other in the vertical direction and are driven at the same speed but in opposite directions such that the loop lengths pressed against the containers 1 move in the transport direction A. The belts 11 of the seventh and eighth belt arrangements 9.4, 10.4 press in the transverse direction, thus urging two container groups 3.2 against one another in the transverse direction to promote adhesion by the second adhesive spots 4.2.

As can be seen from FIG. 4, the transitions between the first, third, and fifth belt arrangements 9.1, 9.2, 9.3 are such that, at each transition, the loops formed by belts of adjacent belt elements overlap along the transport direction A. This maintains continuous contact between the belts 11 and the containers even across transitions between the first and third belt arrangement 9.1, 9.3 and between the third belt arrangement 9.3 and the fifth belt arrangement 9.5. A similar arrangement is at work with the second, fourth, and sixth belt arrangements 10.1, 10.2, 10.3.

Figure 7:
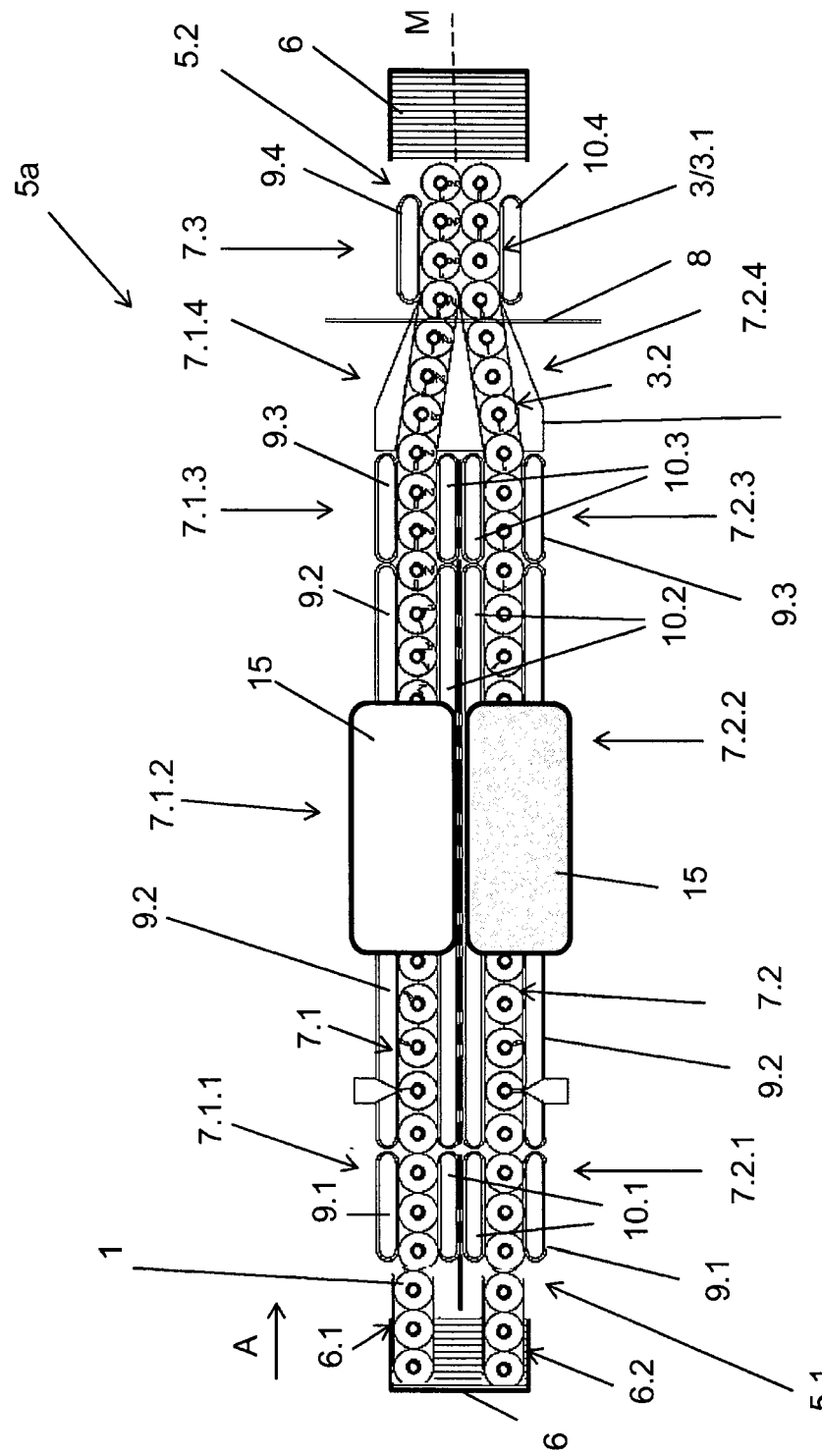

FIGS. 7 and 8 shows an alternative packager 5a in which the dispersion sections 7.1.2, 7.2.2 each include an adhesive application station 15. Each adhesive application station 15 has servo motors that participate in aligning containers before they receive their adhesive spots 4.1, 4.2.

The alternative packager 5a includes an adhesive application station 15 that has first and second plates 16, 17, best seen in FIG. 8. The first and second plates 16, 17 move along corresponding first and second closed motion paths 16.1, 17.1.

As a container approaches the adhesive application station 15, its base is transferred to the first plate 16 and its top engages the second plate 17. This results in the container standing on the first plate 16 and being pressed against the first plate 16 by the second plate 17. This secures the container 1 against tipping over. As a result of their movement along their respective first and second closed motion paths 16.1, 17.1, the first and second plates 16, 17 cooperate to move the container along the transport direction A at the transport speed of the dispersion section 7.1.2.

The first plate 16 engages a first belt 18 and then engages a second belt 20 arranged beneath the first belt 18. A first servo drive 19 operates the first belt 18 and a second servo drive 21 operates the second belt 20. The first and second servo drives 19, 21 receive information from an optoelectronic sensor 22. Based on this information, the first and second servo drives 19, 21 cooperate to rotate the container about its container axis in such a way that its label 2 has a desired orientation when presented to an adhesive applicator 4.

After a first adhesive spot 4.1 has been applied, the first plate 16 engages a third belt 23 controlled by a third servo motor 24. The third servo motor 24 rotates the container by ninety degrees so that it presents the correct face to the next adhesive applicator 4 for application of the second adhesive spot 4.2.

The first, second, and third belts 18, 20, 23 each have a tooth arrangement on an outer side thereof into which a toothed wheel or tooth arrangement of a first plate 16 engages.

In addition, the distance interval between the loop lengths in contact with the containers 1 of the belt arrangements 9.1, 10.1, 9.2, 10.2, 9.3, 10.3, allocated to one another is smaller than the diameter of the containers 1. In typical embodiments, it is to 95% to 97% of the container diameter. Each loop formed from a belt 11 of a belt arrangement 9.1-9.3 lies preferably in a common plane with a loop that is formed by a belt 11 of the allocated belt arrangement.

The invention has been described heretofore by exemplary embodiments. It is understood that numerous alterations and deviations are possible, without thereby departing from the inventive concept underlying the invention.

The invention claimed is:

1. An apparatus for forming a package that comprises at least two rows of containers, each of which has at least two upright containers, each of said containers having a container axis, said apparatus comprising a first treatment segment, a second treatment segment, a first adhesive applicator, a second adhesive applicator, a first re-compacting section, and a second re-compacting section, wherein said first treatment segment receives a first single-track container flow at a container inlet from a conveyor, wherein said second treatment segment receives a second single-track container flow at said container inlet from said conveyor, wherein said first adhesive applicator is configured to apply an adhesive spot to a container in said first treatment segment, wherein said second adhesive applicator is configured to apply an adhesive spot to a container in said second treatment segment, wherein said first re-compacting section is configured to receive a dispersed container flow and to re-compact said dispersed container flow, wherein said second re-compacting section is configured to receive a dispersed container flow and to re-compact said dispersed container flow, wherein said first and second treatment segments each comprise belt arrangements that form closed horizontal loops, wherein each belt arrangement comprises a plurality of belts, each of which has inner loop length that contacts containers and propels said containers along a direction, wherein at least one of said belt arrangements comprises a first belt that engages a container on a first side and a second belt that engages said container on a second side that is opposite said first side, wherein said first and second belts are driven at different speeds thereby causing a container engaged by said first and second belts to be rotated by an extent that depends on a speed differential between said first and second belts and thereby enabling containers to be simultaneously propelled and rotated for application of adhesive spots to selected locations on said containers.

2. An apparatus for forming a package that comprises at least two rows of containers, each of which has at least two upright containers, each of said containers having a container axis, said apparatus comprising a first treatment segment, a second treatment segment, a first adhesive applicator, a second adhesive applicator, a first re-compacting section, and a second re-compacting section, wherein said first treatment segment receives a first single-track container flow at a container inlet from a conveyor, wherein said second treatment segment receives a second single-track container flow at said container inlet from said conveyor, wherein said first adhesive applicator is configured to apply an adhesive spot to a container in said first treatment segment, wherein said second adhesive applicator is configured to apply an adhesive spot to a container in said second treatment segment, wherein said first re-compacting section is configured to receive a dispersed container flow and to re-compact said dispersed container flow, wherein said second re-compacting section is configured to receive a dispersed container flow and to re-compact said dispersed container flow, wherein said first and second treatment segments each comprise belt arrangements that form closed horizontal loops, wherein each belt arrangement comprises a plurality of belts, each of which has inner loop length that contacts containers and propels said containers along a direction, wherein each of said first and second treatment segments comprises an adhesive application station, wherein said adhesive application station comprises a controller and a plurality of plates, wherein said plates circulate in a closed circulation loop, wherein said controller controls motion of said plates, wherein said controller is configured such that, when a plate engages a container, said controller causes said plate to bring said container to an adhesive applicator and to rotate said container such that said adhesive applicator is able to place an adhesive spot on a selected location on said container.

3. An apparatus for forming a package that comprises at least two rows of containers, each of which has at least two upright containers, each of said containers having a container axis, said apparatus comprising a first treatment segment, a second treatment segment, a first adhesive applicator, a second adhesive applicator, a first re-compacting section, and a second re-compacting section, wherein said first treatment segment receives a first single-track container flow at a container inlet from a conveyor, wherein said second treatment segment receives a second single-track container flow at said container inlet from said conveyor, wherein said first adhesive applicator is configured to apply an adhesive spot to a container in said first treatment segment, wherein said second adhesive applicator is configured to apply an adhesive spot to a container in said second treatment segment, wherein said first re-compacting section is configured to receive a dispersed container flow and to re-compact said dispersed container flow, wherein said second re-compacting section is configured to receive a dispersed container flow and to re-compact said dispersed container flow, wherein said first and second treatment segments each comprise belt arrangements that form closed horizontal loops, wherein each belt arrangement comprises a plurality of belts, each of which has inner loop length that contacts containers and propels said containers along a direction, said apparatus further comprising a servo drive and a belt driven by said servo drive, wherein said belt is arranged along a portion of said closed circulation loop such that said belt engages a plate, and wherein said controller controls said servo motor to bring said container to an adhesive applicator and to rotate said container such that said adhesive applicator is able to place an adhesive spot on a selected location on said container.

4. An apparatus for forming a package that comprises at least two rows of containers, each of which has at least two upright containers, each of said containers having a container axis, said apparatus comprising a first treatment segment, a second treatment segment, a first adhesive applicator, a second adhesive applicator, a first re-compacting section, and a second re-compacting section, wherein said first treatment segment receives a first single-track container flow at a container inlet from a conveyor, wherein said second treatment segment receives a second single-track container flow at said container inlet from said conveyor, wherein said first adhesive applicator is configured to apply an adhesive spot to a container in said first treatment segment, wherein said second adhesive applicator is configured to apply an adhesive spot to a container in said second treatment segment, wherein said first re-compacting section is configured to receive a dispersed container flow and to re-compact said dispersed container flow, wherein said second re-compacting section is configured to receive a dispersed container flow and to re-compact said dispersed container flow, wherein said first and second treatment segments each comprise belt arrangements that form closed horizontal loops, wherein each belt arrangement comprises a plurality of belts, each of which has inner loop length that contacts containers and propels said containers along a direction, said apparatus further comprising a sensor-controlled rod that extends transversely relative to said transport direction and that moves along said transport direction, said sensor-controlled rod being between a common section and merging sections upstream of said common section.

5. The apparatus of claim 1, wherein each belt arrangement comprises at least a first belt and a second belt, wherein said first belt defines a loop having a loop length at which said first belt engages containers, wherein said second belt defines a loop having a loop length at which said second belt engages containers, and wherein said loop length of said first belt and said loop belt of said second belt are spaced apart from each other in a direction parallel to said container axes.

6. The apparatus of claim 1, wherein said re-compacting sections each comprise a pair of belt arrangements, each of which is driven in an endless loop, and each of which has a length that extends in a transport direction and that contacts containers in said container flow to propel said containers along said transport direction at a second transport speed that is less than a first transport speed at which containers enter said re-compacting section, whereby a container flow leaving said re-compacting section is more compact than a container flow entering said re-compacting section.

7. The apparatus of claim 4, wherein said re-compacting sections each comprise a pair of belt arrangements, each of which is driven in an endless loop, and each of which has a length that extends in a transport direction and that contacts containers in said container flow to propel said containers along said transport direction at a second transport speed that is less than a first transport speed at which containers enter said re-compacting section, whereby a container flow leaving said re-compacting section is more compact than a container flow entering said re-compacting section.

8. The apparatus of claim 1, wherein each of said first and second treatment segments comprises a compacting section upstream of said re-compacting section, wherein said compacting section comprises a pair of belt arrangements, each of which is driven in an endless loop, and each of which has a length that extends in a transport direction and that contacts containers in said container flow to propel said containers along said transport direction at a second transport speed that is less than a first transport speed at which containers enter said compacting section, whereby a container flow leaving said compacting section is more compact than a container flow entering said compacting section.

9. The apparatus of claim 3, wherein each of said first and second treatment segments comprises a compacting section upstream of said re-compacting section, wherein said compacting section comprises a pair of belt arrangements, each of which is driven in an endless loop, and each of which has a length that extends in a transport direction and that contacts containers in said container flow to propel said containers along said transport direction at a second transport speed that is less than a first transport speed at which containers enter said compacting section, whereby a container flow leaving said compacting section is more compact than a container flow entering said compacting section.

10. The apparatus of claim 4, wherein each of said belt arrangements comprises a first belt and a second belt, wherein said first belt forms a first closed loop and said second belt forms a second closed loop, wherein said first closed loop is offset from said second closed loop in a direction parallel to said container axes, and wherein said first closed loop and said second closed loop are in parallel planes that are perpendicular to said container axes.

11. The apparatus of claim 3, wherein each of said first and second treatment segments comprises a first belt arrangement and a second belt arrangement downstream from said first belt arrangement, wherein said first belt arrangement ends at a transition point and wherein said second belt arrangement begins at said transition point, wherein said first and second belt arrangements overlap at said transition point, whereby containers traversing a treatment segment remain in continuous contact with a belt arrangement.

12. The apparatus of claim 1, wherein said first and second treatment segments are linear segments.

13. The apparatus of claim 2, wherein said first and second treatment segments are linear segments.

14. The apparatus of claim 2, wherein said first and second adhesive applicators are configured to apply adhesive spots on a container, said adhesive spots being at right angles to each other along a circumferential direction of said container.

15. The apparatus of claim 3, wherein said first and second adhesive applicators are configured to apply adhesive spots on a container, said adhesive spots being at right angles to each other along a circumferential direction of said container.

16. The apparatus of claim 1, further comprising first, second, and third pulleys, wherein said dispersed container flow extends between said first and second pulleys and a re-compacted flow extends between said second and third pulleys.

17. The apparatus of claim 1, further comprising merging sections disposed downstream of said re-compacting sections and a common section that follows said merging sections, and an access lock that ensure that containers that enter said common section are moving at the same transport speed.

18. The apparatus of claim 2, further comprising merging sections disposed downstream of said re-compacting sections and a common section that follows said merging sections, and an access lock that ensure that containers that enter said common section are moving at the same transport speed.

19. The apparatus of claim 2, further comprising an optoelectronic sensor disposed to inspect containers that are upstream from at least one of said first and second adhesive applicators.

20. The apparatus of claim 3, further comprising an optoelectronic sensor disposed to inspect containers that are upstream from at least one of said first and second adhesive applicators.

* * * * *